INVENTOR:
RUSSELL N. EDWARDS,
BY
AGENT

United States Patent Office 3,572,426
Patented Mar. 23, 1971

3,572,426
UNDERWATER HEAT EXCHANGE SYSTEM
Russell N. Edwards, Cincinnati, Ohio, assignor to
General Electric Company
Filed Oct. 5, 1967, Ser. No. 673,051
Int. Cl. F28d 5/00
U.S. Cl. 165—47          5 Claims

ABSTRACT OF THE DISCLOSURE

A safe, efficient and simple system for transferring heat from within an underwater vehicle to the surrounding water environment comprises an array of sealed tubes passing through the outer skin of the vehicle and protruding into the water surrounding the vehicle. Each of the tubes is designed to withstand the pressure of the underwater environment. Each tube contains a heat exchange medium having a high heat of vaporization operating at a pressure such that it will transfer heat by vaporizing and condensing.

INTRODUCTION

This invention pertains to an underwater heat exchange system and particularly to one suitable for the rejection of heat from a deep submergence oceanic vehicle.

BACKGROUND OF THE INVENTION

A convenient coolant for underwater vehicles is the surrounding water environment in which these vehicles operate. In one type of system, sea water is introduced for cooling purposes into the interior of an underwater vehicle. There is an inherent hazard in this type of system, particularly at great depth, due to the high pressure of the cooling water. Any failure in the pressure containment apparatus of such cooling systems may result in catastrophic failure of the entire vehicle.

Other systems depend on the utilization of the vehicle's outer skin as a heat exchange surface. This means of heat exchange is impractical if the amount of heat to be rejected is substantial, because of the generally poor heat transfer characteristics of the outer skin of these vehicles. In view of the underwater pressure which the outer skin must withstand, thick sections of high strength material are used in its construction. Such sections are usually poor heat conductors. Thus improvement is not likely in the heat transfer characteristics of skin material.

It is therefore an object of the present invention to provide a safer heat exchange system for underwater vehicles.

It is another object of this invention to provide a novel and more efficient system for the rejection of heat from the interior of a deep submergence underwater vehicle.

Still another object of this invention is to provide an underwater heat exchange system in which the danger of catastrophic failure through breakdown of pressure containment means is substantially reduced.

BRIEF SUMMARY OF THE INVENTION

These and other objects are met, in accordance with the present invention, by a plurality of sealed tubes each exposed at one end to the water environment surrounding an underwater vehicle and at the other end to a source of heat, within the vehicle, to be rejected to the surrounding water environment. Each of the tubes contains a heat exchange fluid at a pressure such that it vaporizes at the end in contact with a heat source and condenses at the end immersed in the surrounding water environment. These tubes, commonly known as heat pipes, are composed of a material sufficiently strong and/or thick to resist the pressure of the surrounding water environment. They are mounted in and sealed to a segment of the outer skin of the vehicle. In the preferred form of the present invention, the heat exchange efficiency of the system is improved by immersed pump-induced forced circulation of coolant water around the surfaces of the heat pipes outside of the vehicle.

DETAILED DESCRIPTION OF THE INVENTION

While the specification concludes with claims particularly pointing out and distinctly claiming the subject matter of the present invention, this invention may be better understood from the following description, taken in conjunction with the following drawings, in which:

Figure 1:
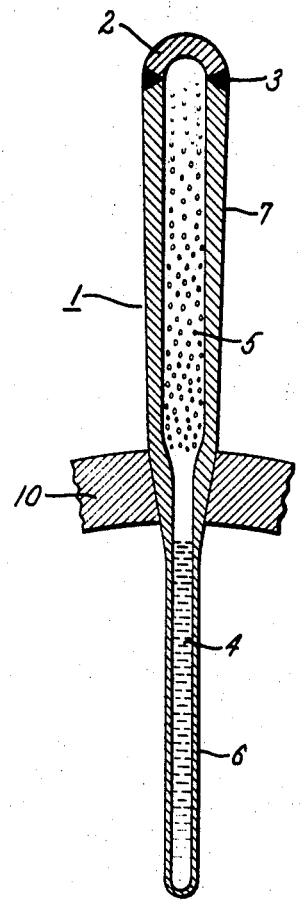
FIG. 1 is a cross sectional view of an individual heat pipe mounted in the outer skin of an underwater vehicle.

In FIG. 1 there is shown a heat pipe 1 having a cap 2 and a closure seal 3 on the interior thereof sealing within the heat pipe 1 a heat exchanger liquid 4 and its vapor 5. Heat pipe 1 penetrates and is sealed at its outer periphery to a segment of the outer skin 10 of an underwater vehicle. Heat pipe 1 includes two sections: a hot or vaporization section 6 exposed to a source of heat to be rejected from within the outer skin 10 of the vehicle and a cool or condensation section 7 outside of outer skin 6 and in contact with the surrounding water environment, not shown. The vaporization section 6 is shorter and has a smaller diameter than condensation section 7 because in this particular design the heat transfer coefficient in vaporization section 6 exceeds that in condensation section 7 and a balanced design results from an area ratio which has been chosen to yield similar temperature drops in the respective sections of heat pipe 1. The material and thickness of heat pipe 1 is selected with regard both to its heat transfer characteristics and the necessity that it withstand the pressure of the surrounding water environment at the depth for which the system is designed. Thick walled aluminum or high strength steel is generally suitable for this purpose. The composition of the heat exchange fluid is chosen so as to yield a large product of pressure, heat of vaporization, and vapor flow velocity so as to maximize the heat transferred to and from the fluid in the vaporization and condensation segments respectively. Typically ammonia at several atmospheres pressure may be used as a heat exchange fluid in a deep submergence oceanic vehicle in which the heat source is condensing steam near atmospheric pressure. Other heat exchange fluids may be preferred depending on the working temperature and pressure of the system. If the composition of the heat exchange fluid is such that the internal pressure in heat pipe 1 is intermediate between the pressure in the heat source within the vehicle and the water environment outside of the vehicle, the pressure differentials across the tube wall in the hot and cold sections of heat pipe 1 may be minimized.

To enhance heat transfer in the tubes by increasing the surface area of the tube wall and thinning condensate films, some or all of the tube walls may be provided with corrugations or fins. The interior surfaces of the heat pipes may also be provided with a porous material to assist the movement, by capillary action, of heat exchange fluid from the cool or condensation section of the heat pipe to the hot or vaporization section and to help separate liquid and vapor phase flow.

As one example of the construction and operation of a heat pipe similar to that shown in FIG. 1, a ⅜ inch diameter, 42 inch long stainless steel tube, having a 0.028 inch wall thickness and a closure at one end was evacuated and the 6 inch vaporization section was filled with liquid ammonia at low temperature and sealed. Such a tube would withstand a sea water depth of 15,000 feet without collapsing. In a typical test of this system the vaporization section was exposed to steam at 135 p.s.i. while room temperature water flowed, at 0.31 pound per second, through a water jacket around the remaining 36 inches of the tube. Heat transfer in terms of power density, through the tube was observed to be about 30 kilowatt per square foot of boiling ammonia tube area.

Figure 2:
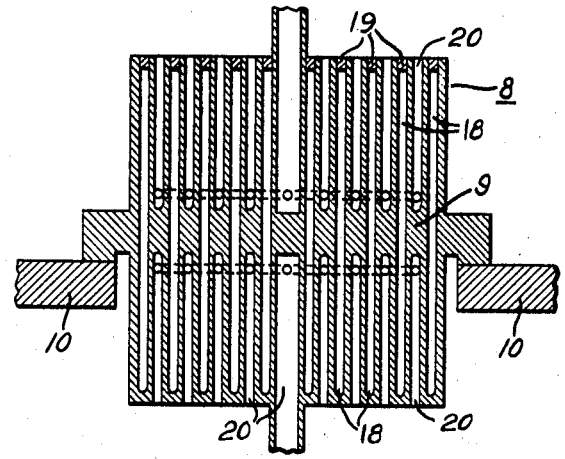
FIG. 2 is a cutaway schematic view of an array of heat pipes as used in the present invention.

In FIG. 2 there is shown an array of heat pipes 8 machined from a single forging with a central unmachined portion 9 which is mounted in an opening in the underwater vehicle's outer skin 10. This single piece construction provides maximum protection against the pressure failure around the periphery of the heat pipes where the heat pipes would otherwise penetrate a segment of the outer skin of the underwater vehicle. For optimum space utilization, each condensate-vapor passageway 18 in array 8 includes a 180° turn to increase its effective length and surface area and a closure plug 19. Between passageways 18, interconnected paths 20, terminating at central portion 9, are provided for circulation of hot and cool fluids around passageways 18 on the inner and outer sides, respectively, of central unmachined portion 9.

Figure 3:
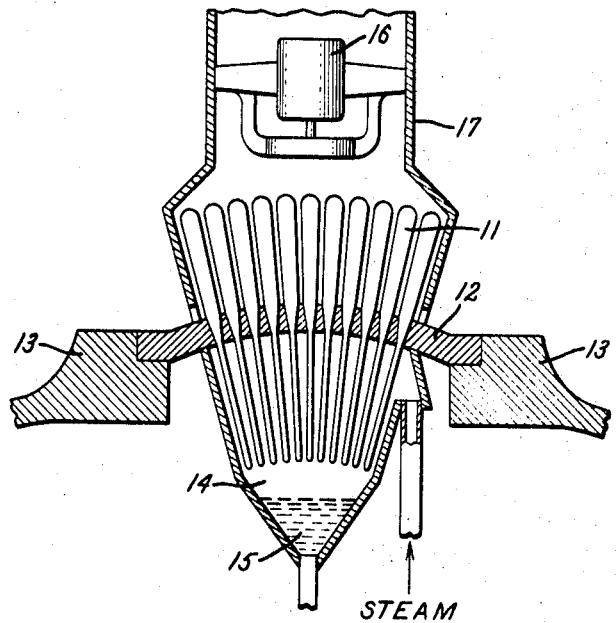
FIG. 3 is a cutaway schematic view of the preferred form of the present invention in which forced circulation of coolant water is utilized.

Referring now to FIG. 3, there is shown the preferred form of the present invention comprising a radially disposed array of heat pipes 11 penetrating an array mount and sealing member 12 mounted to a hatch 13 in the outer skin of an underwater vehicle. The inner ends of this array are disposed in a steam chamber 14 with a condensate collection pool 15. A pumping means immersed in the surrounding water 16 and a partially open enclosure 17 for the outer ends of the array of heat pipes 11 provides forced circulation of coolant water around the array 11 to enhance the heat transfer efficiency of the system in this embodiment of the invention. A power density of 50 kilowatts per square foot of stream condensing area may be attainable in this system.

Arrayed and used as described above, heat pipes provide a nonpenetrating heat exchange system for underwater vehicles with a very large effective heat transfer coefficient. This may be attributed to the large surface area of heated pipes exposed to the heat source, usually steam and coolant water (relative to the hatch area) and to the inherent low temperature drop of the heat pipes. Furthermore this system is safe due to its redundancy in pressure containment means. More specifically, for high pressure coolant water to be introduced into the interior of the vehicle through the heat exchange system, two failures are required, one on a heat pipe surface outside of the vehicle and a second on the interior of the vehicle in the same heat pipe. An additional advantage of this system is that notwithstanding the failure and/or flooding of a single tube the remaining heat pipes will continue to function. In addition, relatively good heat transfer may be attained in a system with no moving parts. This is important because of its simplicity and because it avoids detection by common detection means such as sonar, allowing the effective use of these devices in silent powerplants.

While the present invention has been described with reference to particular embodiments thereof for purposes of clarity and convenience, it should be understood that numerous modifications may be made by those skilled in the art without departing from the invention's true spirit and scope. Therefore the appended claims are intended to cover all such equivalent variations as come within the true spirit and scope of the present invention.

What I claim as new and desire to secure by Letters Patent of the United States is:

1. An underwater vehicle with a source of heat therein and a heat exchanger means for transferring heat from said source to the exterior of said vehicle, said heat exchanger means consisting of an array of sealed tubes, each of said tubes consisting of a lower condensate-containing segment within said vehicle and an upper vapor-containing segment outside of said vehicle, said array further including means on the exterior of said tubes for maintaining a substantial pressure differential between the space surrounding said lower condensate-containing tube segments and the space surrounding said upper vapor-containing tube segments.

2. An underwater vehicle and heat exchanger means, such as that recited in claim 1, wherein said heat exchanger means further includes means for providing forced water circulation around the outer surfaces of said sealed tubes in the cool segments thereof.

3. An underwater vehicle and heat exchanger means, such as that recited in claim 1, wherein said sealed tubes include large surface area heat transfer surfaces to enhance their heat transfer characteristics.

4. An underwater vehicle and heat exchanger means, such as that recited in claim 1, wherein porous material is disposed on at least part of the inner surfaces of said sealed tubes, extending between said lower condensate-containing segment and said upper vapor-containing segment, whereby the movement of condensate from the upper segment to the lower segment in each of said tubes is enhanced and separated from vapor flow.

5. An underwater vehicle and a heat exchanger means such as that recited in claim 1, wherein said upper segments are surrounded by a relatively high pressure, relatively low temperature fluid while said lower segments are surrounded by a relatively low pressure, relatively high temperature fluid and the pressure in said sealed tubes is intermediate between that of the space surrounding said upper segments and that surrounding said lower segments.

References Cited

UNITED STATES PATENTS

| | | | |
|---|---|---|---|
| 1,725,906 | 8/1929 | Gay | 165—105 |
| 1,750,750 | 3/1930 | Gay | 165—105 |
| 3,229,759 | 1/1966 | Grover | 165—105 |

FOREIGN PATENTS

| | | | |
|---|---|---|---|
| 1,294,211 | 4/1962 | France | 165—105 |
| 457,326 | 3/1928 | Germany | 165—105 |
| 899,328 | 6/1962 | Great Britain | 165—105 |

VERLIN R. PENDEGRASS, Primary Examiner

U.S. Cl. X.R.

165—105